(12) United States Patent
Kempter et al.

(10) Patent No.: US 8,527,951 B2
(45) Date of Patent: Sep. 3, 2013

(54) METHOD FOR THE COMPUTER-AIDED DETERMINATION OF AN OPTIMIZATION POTENTIAL OF A SOFT-WARE SYSTEM

(75) Inventors: Bernhard Kempter, München (DE);
Florian Mangold, München (DE);
Michael Pönitsch, München (DE)

(73) Assignee: Siemens Aktiengesellschaft, Munich (DE)

( * ) Notice: Subject to any disclaimer, the term of this patent is extended or adjusted under 35 U.S.C. 154(b) by 1020 days.

(21) Appl. No.: 12/450,284

(22) PCT Filed: Mar. 5, 2008

(86) PCT No.: PCT/EP2008/052638
§ 371 (c)(1),
(2), (4) Date: Sep. 18, 2009

(87) PCT Pub. No.: WO2008/113681
PCT Pub. Date: Sep. 25, 2008

(65) Prior Publication Data
US 2010/0095275 A1 Apr. 15, 2010

(30) Foreign Application Priority Data

Mar. 20, 2007 (DE) .......................... 10 2007 013 395
Jun. 25, 2007 (DE) .......................... 10 2007 029 134

(51) Int. Cl.
*G06F 9/44* (2006.01)
(52) U.S. Cl.
USPC ........................................................ 717/124
(58) Field of Classification Search
None
See application file for complete search history.

(56) References Cited

U.S. PATENT DOCUMENTS 5,828,883 A 10/1998 Hall
6,381,735 B1 4/2002 Hunt
(Continued)

FOREIGN PATENT DOCUMENTS

WO   WO 2008040062 A   4/2008

OTHER PUBLICATIONS

Cook R. P.: Thread Verification—an experience report. Department of Computers Sciences, Georgia Southern University, Statesboro, GA, U.S.A. Internet: http://www.cs.utah.edu/~ganesh/misc/Binder1.pdf, (rech.Aug. 22, 2007); Others.

(Continued)

*Primary Examiner* — Philip Wang
(74) *Attorney, Agent, or Firm* — Harness, Dickey & Pierce

(57) ABSTRACT

A method is disclosed for the computer-aided determination of the optimization potential of a software system including a plurality of modules that can interact with each other at least to some point during execution of the software system. At least one module to be examined is selected from the plurality of modules, in at least one embodiment, and is examined with respect to the effects of an optimization of the at least one module to be examined on the overall consumption of resources of the software system. A respective consumption of resources of one or more modules not to be examined of the plurality of modules is varied according to at least one predetermined criterion, thereby obtaining a modified software system. The overall consumption of resources of the modified software system is determined taking into consideration the variation of the modules not to be examined. The determined overall consumption of resources of the modified software system is then compared to the overall consumption of resources of the unmodified software system.

20 Claims, 2 Drawing Sheets

(56) References Cited

U.S. PATENT DOCUMENTS

| | | | |
|---|---|---|---|
| 2001/0032332 A1 | 10/2001 | Ward et al. | |
| 2002/0152305 A1* | 10/2002 | Jackson et al. | 709/224 |
| 2006/0224925 A1* | 10/2006 | Lake | 714/38 |
| 2008/0114870 A1* | 5/2008 | Pu | 709/224 |
| 2009/0276762 A1* | 11/2009 | Ponitsch | 717/127 |
| 2010/0088663 A1* | 4/2010 | Hammer et al. | 717/101 |

OTHER PUBLICATIONS

Steffan, J. G., Hardware Support for Thread-Level Speculation, Thesis, Computer Science Department, Carnegie Mellon University Pittsburgh, PA, USA, Apr. 2003 Internet http://reports-archive.adm.cs.cmu.edu/anon/2003/CMU-CS-03-122.ps pp. 1, 2, vi-ix; Others.

Medvidovic N., Architecture Based Specification—Time Software Evolution, Dissertation, Information and Computer Science, University of California, Irvine, 1999 (rech. Aug. 22, 2007) Internet: http://sunset.usc.edu/~neno/dissertation/dissertation2.pdf ? pp. 1, 2, iv-viii; Others.

Internet: Whitepaper "Optimizing Speed vs. Size—Using the CodeBalance Utility for ARM/Thumb and MIPS16 Architectures", Nov. 30, 1998, http://www.ghs.com/wp/codebal.pdf; Others.

Chang P. et al., "Using Profile Information to assist classic code optimizations", Software Practice & Experience, Wiley & Sons, Bognor, Regis, GB, vol. 21, No. 12, Dec. 1, 1992, pp. 1301-1321; Others.

Cook R. P.: Thread Verification—an experience report. Department of Computers Sciences, Georgia Southern University, Statesboro, GA, U.S.A. Internet http://www.cs.utah.edu/~ganesh/misc/Binder1.pdf, (rech.Aug. 22, 2007); Others.

Cain III H.W.: Detecting and Exploiting Causal Relationships in Hardware Shared-Memory Multiprocessors. Dissertation, Computer Sciences, University of Wsconsin-Madison, Internet: http://pages.cs.wisc.edu/~cain/pubs/cain_thesis_final.pdf, pp. 1-2, vii-ix; Others; 2004.

Steffan, J. G., Hardware Support for Thread-Level Speculation, Thesis, Computer Science Department, Carnegie Mellon University Pittsburgh, PA, USA, Apr. 2003 Internet:http://reports-archive.adm.cs.cmu.edu/anon/2003/CMU-CS-03-122.ps pp. 1, 2, vi-ix; Others.

Medvidovic N., Architecture Based Specification-Time Software Evolution, Dissertation, Information and Computer Science, University of California, Irvine, 1999 (rech. Aug. 22, 2007) Internet:http://sunset.usc.edu/~neno/dissertation/dissertation2.pdf ? pp. 1, 2, iv-viii; Others.

Michael D. Smith, "Overcoming the Challenges to Feedback-Directed Optimization", ACM Sigplan Notices, ACM Association for Computing Machinery, New York, NY, US, Jan. 1, 2000,; Others.

Internet Whitepaper "Optimizing Speed vs. Size—Using the CodeBalance Utility for ARM/Thumb and MIPS16 Architectures", Nov. 30, 1998, http://www.ghs.com/wp/codebal.pdf; Others.

Conte T. M. et al., "Accurate and practical profile-driven compilation using the profile buffer", Proceedings of the 29th Annual IEEE/ACM International Symposium on Microarchitecture, MICRO-29, Paris, Dec. 2-4, 199, IEEE Comp. Soc. Press, Los Alamitos; Others.

Chang P. et al., "Using Profile Information to assist classic code optimizations", Software Practice & Experience, Wiley & Sons, Bognor, Regis, GB, Vol, 21, No. 12, Dec. 1, 1992, pp. 1301-1321; Others.

Graham S. L. et al., "An Execution Profiler for Modular Programs, Software Practice & Experience", Wiley and Sons, Bognor Regis, GB, vol. 13, No. 7, Jan. 1, 1983; Others.

\* cited by examiner

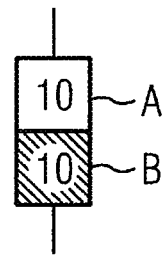
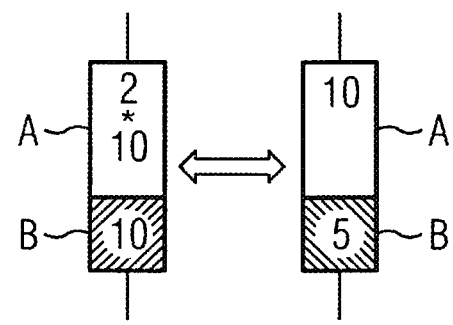
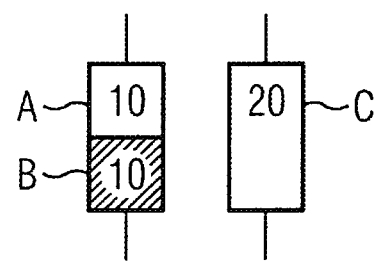
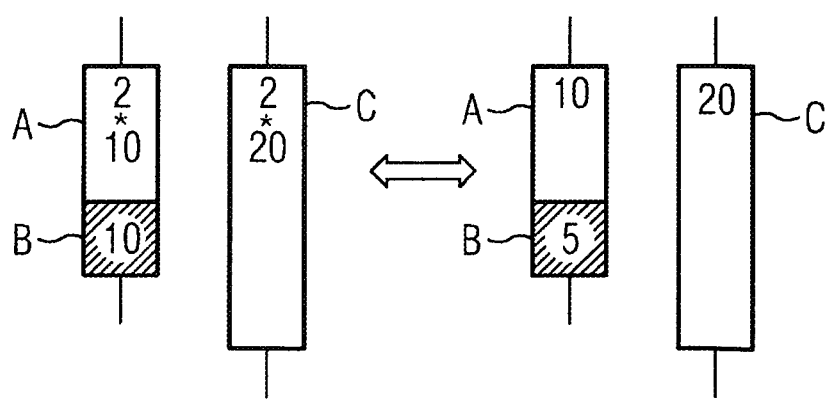

METHOD FOR THE COMPUTER-AIDED DETERMINATION OF AN OPTIMIZATION POTENTIAL OF A SOFT-WARE SYSTEM

PRIORITY STATEMENT

This application is the national phase under 35 U.S.C. §371 of PCT International Application No. PCT/EP2008/052638 which has an International filing date of Mar. 5, 2008, which designated the United States of America and which claims priority on German patent application numbers DE 10 2007 013 395.4 filed Mar. 20, 2007 and DE 10 2007 029 134.7 filed Jun. 25, 2007, the entire contents of each of which are hereby incorporated herein by reference.

FIELD

At least one embodiment of the invention generally relates to a method for computer-aided determination of the optimization potential of a software system comprising a plurality of modules, at least some of which can interact with one another during execution of the software system.

BACKGROUND

Complex software systems comprising a large number of different and to some extent interacting modules are often created by a plurality of programmers. The problem often arises here that the performance of the software system is unsatisfactory. As a complex software system is not easy to understand, the problem is often to decide which module or modules of the software system need to be optimized in order to enable the performance to be improved or resource consumption such as e.g. memory requirement to be reduced. It is possible, for example, to identify the module or modules constituting a resource shortfall, a performance problem or a bottleneck. In general, however, it cannot be estimated how the performance of the software system or the total resource consumption of the resource system will change when the module or modules in question are optimized.

Profiler data can be used in simple software systems, particularly so-called single-threaded systems, using methods without side effects in order to obtain an estimate as to the extent to which optimization of the software system will affect its runtime characteristics. One disadvantage, however, is that this is only possible for simple systems such as single-threaded systems. In particular, side effects cannot be taken into account.

Current programmer practice for optimizing the software system is to comment out or simulate modules which could be the cause of the performance problem and therefore estimate their contribution to performance. However, this approach is not possible in complex systems due to functional dependencies in the software code.

Also known is so-called "snapshot differencing". With this method the volatility of the software code can be dealt with by creating a snapshot of the unchanged and of a changed software code. However, this procedure requires in some cases very complex/costly reengineering of the software system under examination.

SUMMARY

At least one embodiment of the present invention specifies a method for computer-aided determination of the optimization potential of a software system that is simple to implement and can be reliably used even for complex software systems.

The inventive method of at least one embodiment for computer-aided determination of the optimization potential of a software system incorporating a plurality of modules, at least some of which can interact with one another during execution of the software system, comprises the following steps: from the plurality of modules, at least one module under examination is determined which is to be examined in respect effects of an optimization of the at least one module under examination on the overall or total resource consumption of the software system. A respective resource consumption of one or more or all of the modules not under examination of the plurality of modules is varied according to at least one predefined criterion, thereby obtaining a modified software system. The total resource consumption of the modified software system is determined taking into account the variation of the modules that are not under examination. Finally, the determined total resource consumption of the modified software system is compared with the total resource consumption of the unmodified software system.

The principle on which at least one embodiment of the invention is based resides in artificially increasing the resource consumption of all the resource-consuming parts of the software system so that the system parts to be examined appear to have reduced resource consumption. If one or more or all the modules are e.g. slowed down, an overall system can be simulated e.g. half as quickly thereby. This is comparable to throttling. If when the resource consumptions of the modules of the overall system are increased one or more modules are unchanged in their resource consumption, this module or these modules are reduced relative to the overall system. By way of this procedure, the module(s) under examination will appear more efficient or the resource consumption will seem lower, virtually an optimized simulation taking place.

The variation in the resource consumption is advantageously an increase in the resource consumption. In the case of the runtime, the increase in the resource consumption can be, for example, a prolongation, i.e. a lengthening of the runtime, of a module in question.

According to another embodiment, in the case of a deterministic software system, the predefined criterion can be a factor by which the resource consumption of the modules not under examination is varied, the same factor being selectable for all the modules not under examination. Alternatively, different factors can be selected for the modules not under examination.

According to another embodiment, in the case of a non-deterministic software system, the predefined criterion can be a respective factor for each of the modules not under examination which is produced by multiplying one or a respective optimization factor by a resource consumption determined in each case for the module in question, in particular the runtime. It can also be provided that the varied resource consumption, in particular the runtime, determined for a module in question is transferred to calling modules of the software system and is taken into account for determining the varied resource consumption of a calling module.

It is also advantageous for the measurement results of the modules which are not to be taken into account to be normalized for determining the total resource consumption of the modified software system, thereby allowing comparability of an unmodified software system with a modified software system. This provides a simple method/way of determining the potential for optimizing one or more modules under examination.

Another embodiment involves repeatedly carrying out the steps of the method according to the invention using different variations of the modules not under examination, thereby making it possible to gauge by which factor a module under examination must be improved in order to obtain maximum optimization of the total resource consumption.

Another embodiment involves a computer program product which can be loaded directly into the internal memory of a digital computer and comprises software code sections with which the steps of the described method are executed when the program is run on a computer.

BRIEF DESCRIPTION OF THE DRAWINGS

Embodiments of the invention will now be explained in greater detail with reference to the accompanying drawings in which:

FIG. 1 shows a first example embodiment which explains the method according to the invention with reference to a single-threaded system, FIG. 2 shows another example embodiment which explains the inventive method with reference to a multi-thread system.

DETAILED DESCRIPTION OF THE EXAMPLE EMBODIMENTS

Figure 3:
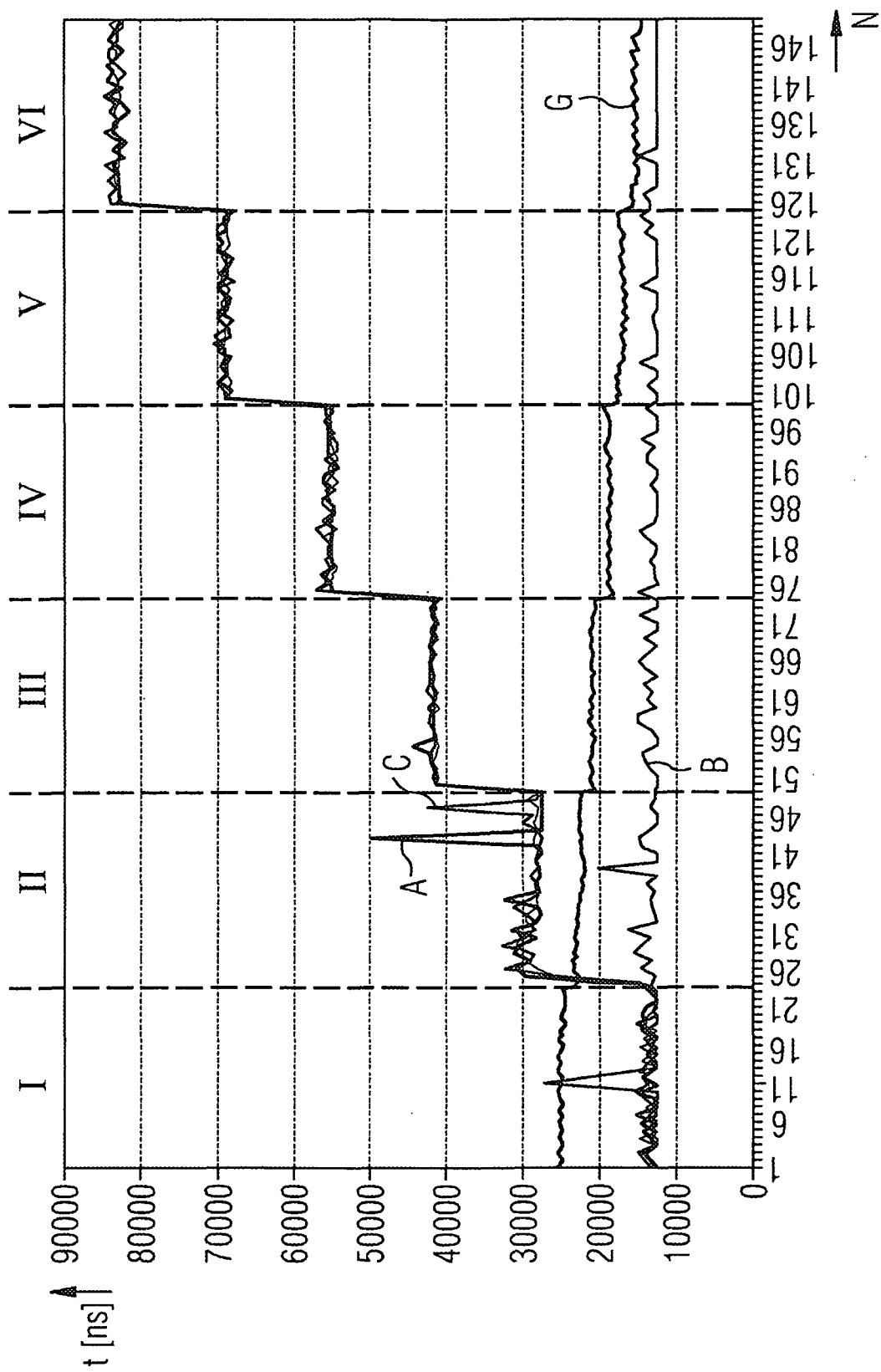
FIG. 3 shows a diagram representing the overall performance as a function of different variations of the software system under examination.

The idea underlying at least one embodiment of the invention resides in simulating the optimization potential of one or more modules in terms of the effect on the total resource consumption of the software system. This means that the module under examination itself is not optimized in order to examine the effect of the optimization on the overall system. Instead, at least one or preferably all of the software system modules that are not under examination are made worse in terms of their resource consumption. Thus, for example, the runtime of a module not under examination is artificially prolonged. In a simulation, the software system therefore behaves more slowly or the resource requirement increases, compared to an unmodified software system.

The underlying principle here is that when the software system modules not under examination are prolonged, the module under examination, which is not prolonged, appears shortened relative to the overall system. If the results of a runtime measurement of the overall system are divided by the selected prolongation factor (normalized), runtime measurement values are obtained for which the module appears as efficient, or gives the impression of a lower resource consumption, as it had been simulated. Through this method, the module under examination appears more efficient or rather the resource consumption lower, it being virtually simulated in an optimized manner.

The underlying idea resides in artificially increasing the resource consumption of the resource-consuming modules of the software system so that the modules under examination appear shortened. Ideally, as part of the optimized simulation, one module is examined, while all the other software system modules not under examination are varied, i.e. their resource consumption is increased. It is also conceivable for a plurality of modules to be examined simultaneously. It is likewise conceivable for the resource consumption not to be increased for all the modules under examination, but only for a portion thereof.

FIG. 1 shows a first example embodiment in which the software system shall consist of two modules A, B which are disposed in a single thread. The two modules A, B have a runtime of ten units. A unit can be, for example, a time unit, milliseconds, seconds, etc. The hatched module B represents the module to be examined or optimized. In accordance with the foregoing description, module A is e.g. doubled in terms of its resource consumption. The factor selected here can be arbitrarily chosen. If the runtimes of the software system in the lower half of FIG. 1 are now considered, it may be seen that module B appears relatively shortened. Whereas in the left-hand lower half the module A has 20 units and the module B (still) has ten units, in the right-hand lower half normalization by the prolongation factor 2 has been performed, so that the module A which is not under examination again has the original value of ten units. Accordingly, the runtime of the module under examination B has halved to five units. Normalization therefore means that the absolute values are divided by the optimization factor, in this case 2. The simulation of the optimization shows that with reengineering of the module B the total runtime of the software system can be reduced by five units.

FIG. 2 shows another example embodiment wherein the software system has three modules A, B, C. The software system is a so-called multi-threaded system comprising two threads running in parallel to one another. In the example, the two threads (the left-hand thread comprises the modules A and B, the right-hand thread comprises the module C) have the same runtime of 20 units. Again, the module B is to be examined, whereas the modules A and C constitute modules that are not under examination. The examination takes place with a view to determining whether reengineering of the module B would make sense in order to make the overall system more efficient.

In the example embodiment, the modules B, C are again doubled in respect of their resource consumption. The lower diagram in FIG. 2 clearly shows that, by way of the simulated optimization, the left-hand thread is now completed in a much shorter time. If this thread now has to wait for the right-hand thread, this means that reengineering will have no positive effect on the software system.

The procedure for implementing the method according to an embodiment of the invention varies depending on whether the software system is deterministic or non-deterministic. A deterministic software system behaves identically at each execution, which means that modules have approximately the same resource consumption when they are executed repeatedly. In a deterministic software system, the resource consumption is measured each time the system is run. After execution, the corresponding resource consumption is added for all the system parts except for those under examination. The measurement results are matched in the above described manner to the artificial resource consumption, i.e. normalized, causing the modules under examination to appear optimized.

A non-deterministic system does not behave in the same way each time the system is run. Therefore, a resource consumption to be artificially added cannot be estimated from profiling information. In the case of a non-deterministic software system, each module that is not be examined in respect of optimization is included in an automated process using a function which measures the current resource consumption during execution and then adds the measured value, multiplied by an optimization factor, as the resource consumption. Modules not under examination are not included with this function and therefore appear shortened by the optimization factor.

Modules with a higher stack depth are varied first in respect of their resource consumption. Higher stack depth means that such a module is called by another module, which can itself be called by another module. The reason why methods with higher stack depth are prolonged first is because they are processed first and therefore a runtime has already been measured. On the other hand, this procedure is advantageous for achieving maximum measuring accuracy. The measured times of the modules with higher stack depth are forwarded to modules with lower stack depth, i.e. calling modules. This takes place in order to prevent already prolonged modules from being prolonged once more. This means that the times for already prolonged calls and their prolongations must be subtracted from the runtime of a module call to be prolonged.

FIG. 3 shows the result of optimized simulation for the modules A, B and C. The number of measurements is plotted along the X-axis. The runtime of a particular module is plotted in milliseconds along the Y-axis. The simulation is subdivided into six sections I to VI, each section comprising approx. 25 measurements. In section I a number of measurements have been performed in which the modules A and C are subject to no variation. As a result, the three modules A, B, C have an essentially identical runtime. In sections II to VI a number of measurements have been performed in each case, for which prolongation by the factor 2 (section II), the factor 3 (section III), etc., the factor 6 (section VI) has been performed. As FIG. 3 clearly shows, a prolongation of the modules A and C is produced, while the module B continues to have the originally required time. The line marked G represents the resource consumption of the entire software system. As may be easily identified, the total resource consumption reduces as the variation factor increases. In the example embodiment, this means that the total resource consumption is at its best for a prolongation of the modules A and C by a factor of 6, resulting in the conclusion that optimization of the module B will result in an improvement of the total resource consumption of the software system, said total resource consumption being improved the more, the more significantly the resource consumption of the module B can be reduced.

Another implementation of the simulated optimization of parts of a system will now be described.

The JAVA package prolong is an implementation by way of AspectJ, for the simulated optimization of system parts in respect of their performance. The prolong( ) pointcut matches all the methods of the software system, except for the program flow of the method to be simulated and its dynamic context (&&!cflow . . . ). The prolong( ) advice encompasses all the methods apart from the method to be simulated. In this advice, the current time is measured before and after termination of the method (System.nanoTime( )). The time of the method without sub-calls is prolonged by an artificial resource consumption according to the optimization factor.

In the context of the example implementation, a method is representative of a module of the software system.

If the optimization factor is 2, i.e. the method to be optimized is to be simulated twice as fast, the time of all the methods not to be optimized is added on once again by way of artificial resource consumption. However, this does not apply to the time of its sub-calls, these already being prolonged by the stack-type processing.

The program code of the example simulation is as follows:

```
package prolong ;
import trace.Trace2 ;
public aspect prolong {
    declare precedence : Trace2 , prolong ;
    pointcut prolong ( ) :  call ( *  *.* ( .. ) ) && ! cflow
    simulated method
        && ! within ( Trace2 ) ... further not simulated packages,
```

-continued

```
classes etc.
Object around ( ) : prolong ( )
{
    long dt ;
      tvll.entry ( " " + Thread.currentThread ( ) ,  "" +
    thisJoinPoint );
    dt = System.nanoTime ( ) ;
    dt = dt / 1000 ;
    try {
        return proceed ( ) ;
    }
    finally {
        // E n c l o s i n g f u n c t i o n measure time
        dt = ( System.nanoTime ( ) / 1000 − dt ) ;
        long excludedTime = tvll.exitTime ( " " +
        Thread.currentThread ( ) , dt ) ;
        // prolong correctly ( included time has already
        gone )!
        dt = dt − excludedTime ;
        dt = dt * prolongation factor ;
        // calculate ms , ns
        long ms = ( dt ) / 10001 ;
        int ns = ( int ) ( dt ) % 1000 ;
        // .. and p r o l o n g!
        // Insert artificial resource consumption, loop,
        sleep,
                // arithmetic operations, etc...
        // − similar of resource consumption of
        method/system
    }
}
public static int prolongation factor = 0 ;
protected static ThreadProlongLinkedList   tvll ;
public static void main ( String [ ] args ) {
    // set prolongation factor or optimization factor
    !!!
    prolongation factor = j ;
    // call system to be simulated
    program.vv1.maincall ( ) ;
}
}
// A u x i l i a r y c l a s s
static {
    tvll = new ThreadProlongLinkedList ( ) ;
}
}
```

A concatenated list is used for correct simulation in asynchronous software systems. In each element of the concatenated list, the information required for simulation is stored for the corresponding thread. A typical listing is as follows:

```
package prolong;
import java.math.BigInteger;
import java.util.LinkedList;
import java.util.ListIterator;
public class ThreadProlongLinkedList {
    public LinkedList ll;
    ThreadProlongLinkedList( ) {
        ll = new LinkedList( );
    }
    public synchronized void add(Object o) {
        ll.add(o);
    }
    public synchronized long entry(String thread, String
    method) {
        int index;
        ThreadProlong tl_temp;
        index = this.getIndex(thread);
        {
            if (index >= 0) {
                tl_temp = (ThreadProlong) ll.get(index);
                tl_temp.logdepth++;
                tl_temp.stack.push(new BigInteger(" 0 "));
                tl_temp.methodsStack.push(method);
```

-continued

```
                return tl_temp.logdepth;
            } else {
                tl_temp = new ThreadProlong(0, thread);
                tl_temp.stack.push(new BigInteger(" 0 "));
                tl_temp.methodsStack.push(method);
                this.add(tl_temp);
                return 0;
            }
        }
    }
    public synchronized long exitTime(String thread, long time) {
        int index;
        long rw;
        ThreadProlong tl_temp;
        BigInteger bi;
        // SEARCH
        index = getIndex(thread);
        // C H A N G E log depth !!!
        tl_temp = (ThreadProlong) ll.get(index);
        tl_temp.logdepth--;
        // return rw ;
        if (tl_temp.logdepth < 0) {
            tl_temp.stack.clear( );
            tl_temp.methodsStack.clear( );
            return 0;
        } else {
            // get current method time
            // pop
            bi = (BigInteger) tl_temp.stack.pop( );
            // Return value is the current method time !!!
            rw = bi.longValue( );
            // and a d d i n time ...
            bi = bi.add(new BigInteger(" " + time));
            // ... s t o r e this for the n e x t m e t h o d
            // !!!
            bi = bi.add((BigInteger) tl_temp.stack.pop( ));
            tl_temp.stack.push(bi);
            tl_temp.methodsStack.pop( );
            return rw;
        }
    }
    public synchronized BigInteger getTime(String thread) {
        int index;
        ThreadProlong tl_temp;
        index = getIndex(thread);
        if (index >= 0) {
            tl_temp = (ThreadProlong) ll.get(index);
            // Return time
            return tl_temp.time;
        } else {
            tl_temp = new ThreadProlong(0, thread);
            ll.add(tl_temp);
            return (new BigInteger(" 0 "));
        }
    }
    public synchronized void setTime(String thread, String time) {
        int index;
        ThreadProlong tl_temp;
        index = getIndex(thread);
        if (index >= 0) {
            tl_temp = (ThreadProlong) ll.get(index);
            // Return time
            tl_temp.time = new BigInteger(time);
        } else {
            tl_temp = new ThreadProlong(0, thread);
            ll.add(tl_temp);
            tl_temp.time = new BigInteger(time);
        }
    }
    public synchronized int getIndex(String thread) {
        ThreadProlong tl_temp;
        if (ll.size( ) == 0) {
            return -1;
        }
        ListIterator li = ll.listIterator(0);
        tl_temp = (ThreadProlong) ll.get(0);
        if (tl_temp.thread.equals(thread))
            return li.previousIndex( ) + 1;
        else
            while (li.hasNext( )) {
                tl_temp = (ThreadProlong) li.next( );
                if (tl_temp.thread.equals(thread))
                    return li.previousIndex( );
            }
        return -1;
    }
    public synchronized void exit(ThreadProlong tl) {
        ThreadProlong tl_temp;
        if (ll.contains(tl)) {
            tl_temp = (ThreadProlong)
                ll.get((ll.indexOf(tl)));
            tl_temp.logdepth--;
        } else
            ll.add(tl);
    }
}
```

For each thread, an object is incorporated in the concatenated list in order to forward already prolonged times from the sub-calls. These times are matched in each advice. The listing is as follows:

```
package prolong;
import java.math.BigInteger;
import java.util.Stack;
public class ThreadProlong {
    public long logdepth = 0;
    public String thread = " ";
    public BigInteger time;
    public Stack stack;
    public Stack methodsStack;
    public ThreadProlong(long logdepth, String thread) {
        this.logdepth = logdepth;
        this.thread = thread;
        this.time = new BigInteger(" -1 ");
        this.stack = new Stack( );
        this.methodenStack = new Stack( );
    }
}
```

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A computer-aided method for e the determination of software system performance, the software system being stored on a non-transitory computer readable medium and being implemented by a processor, the software system including a plurality of modules, at least some of which are interactable with one another when the software system is executed, the method comprising:
    examining at least one module, from the plurality of modules, with respect to effects of an optimization of the at least one module under examination on a total resource consumption of the software system;
    varying a respective resource consumption of one or more of the plurality of modules not under examination according to at least one criterion, thereby modifying the software system to obtain a modified software system;
    determining a total resource consumption of the modified software system, taking into account the varying of the one or more of the plurality of modules not under examination; and comparing the determined total resource consumption of the modified software system with the total resource consumption of the software system before the modifying.

2. The method as claimed in claim 1, wherein the variation of the resource consumption is an increase in the resource consumption.

3. The method as claimed in claim 2, wherein, in a case of a non-deterministic software system, the at least one criterion is a respective factor for each of the modules not under examination which is produced by multiplying one or a respective optimization factor by a resource consumption for the relevant module, respectively.

4. The method as claimed in claim 3, wherein the varied resource consumption determined for a module in question is transferred to calling modules of the software system and is taken into account for determining the varied resource consumption of a calling module.

5. The method as claimed in claim 2, wherein the steps according to claim 1 are repeatedly carried out with different variations of the modules not under examination.

6. The method as claimed in claim 1, wherein, in a case of a deterministic software system, the at least one criterion is a factor by which the resource consumption of the modules not under examination is varied.

7. The method as claimed in claim 6, wherein an identical factor is selected for all of the modules not under examination.

8. The method as claimed in claim 6, wherein different factors are selected for the modules not under examination.

9. The method as claimed in claim 1, wherein, in a case of a non-deterministic software system, the at least one criterion is a respective factor for each of the modules not under examination which is produced by multiplying one or a respective optimization factor by a resource consumption for the relevant module, respectively.

10. The method as claimed in claim 9, wherein the varied resource consumption determined for a module in question is transferred to calling modules of the software system and is taken into account for determining the varied resource consumption of a calling module.

11. The method as claimed in claim 10, wherein the resource consumption is runtime.

12. The method as claimed in claim 9, wherein the resource consumption is runtime.

13. The method as claimed in claim 1, wherein measurement results of the modules not to be taken into account are normalized for determining the total resource consumption of the modified software system.

14. The method as claimed in claim 1, wherein the steps according to claim 1 are repeatedly carried out with different variations of the modules not under examination.

15. The method as claimed in claim 2, wherein, in a case of a deterministic software system, the at least one criterion is a factor by which the resource consumption of the modules not under examination is varied.

16. The method as claimed in claim 15, wherein an identical factor is selected for all of the modules not under examination.

17. The method as claimed in claim 15, wherein different factors are selected for the modules not under examination.

18. A computer program product including instructions that are stored on a non-transitory computer readable medium that is loadable into the internal memory of a digital computer, comprising:
   software code sections with which the steps according to claim 1 are executable when the computer program product is run on a computer.

19. A non-transitory computer readable medium including program segments for, when executed on a computer device, causing the computer device to implement the method of claim 1.

20. A non-transitory computer readable medium including program segments for, when executed on a computer device, causing the computer device to implement the method of claim 2.

* * * * *